US012588602B2

(12) United States Patent
Ayela et al.

(10) Patent No.: US 12,588,602 B2
(45) Date of Patent: Mar. 31, 2026

(54) UNLOAD TUBE LOCK FOR AGRICULTURAL VEHICLE

(71) Applicant: CNH Industrial America LLC, New Holland, PA (US)

(72) Inventors: Thirumaleswara Ayela, Mechanicsburg, PA (US); Denver Yoder, Manheim, PA (US); Shaun O'Donnell, Quarryville, PA (US)

(73) Assignee: CNH Industrial America LLC, New Holland, PA (US)

( * ) Notice: Subject to any disclaimer, the term of this patent is extended or adjusted under 35 U.S.C. 154(b) by 351 days.

(21) Appl. No.: 18/233,387

(22) Filed: Aug. 14, 2023

(65) Prior Publication Data

US 2025/0057082 A1 Feb. 20, 2025

(51) Int. Cl.
    *A01D 90/10* (2006.01)

(52) U.S. Cl.
    CPC .................................... *A01D 90/10* (2013.01)

(58) Field of Classification Search
    CPC ... A01D 90/10; A01D 41/1217; B28C 5/4251
    See application file for complete search history.

(56) References Cited

U.S. PATENT DOCUMENTS

| | | | |
|---|---|---|---|
| 2,743,571 A | 5/1956 | Turnbull et al. | |
| 3,521,768 A * | 7/1970 | Rohwedder | A01D 41/1217 198/538 |

| | | | |
|---|---|---|---|
| 4,094,254 A * | 6/1978 | Koranda | B61D 7/20 105/310.1 |
| 4,522,552 A * | 6/1985 | Raineri | A01D 41/1217 198/861.6 |
| 5,876,176 A * | 3/1999 | Smith | B60P 1/42 414/523 |

(Continued)

FOREIGN PATENT DOCUMENTS

| | | |
|---|---|---|
| DE | 19802199 A1 | 7/1999 |
| EP | 2489253 A1 | 8/2012 |
| JP | 2005176697 A | 7/2005 |

OTHER PUBLICATIONS

The Extended European Search Report issued Jan. 27, 2025, by the European Patent Office in corresponding European Patent Application No. 24193648.3-1004. (6 pages).

*Primary Examiner* — Cathleen R Hutchins
(74) *Attorney, Agent, or Firm* — Buchanan Ingersoll & Rooney PC

(57) ABSTRACT

A combine harvester includes a frame member, an unload tube, a pivotable cradle member and a locking device. The unload tube for expelling clean grain is moveable relative to the clean grain tank and the frame member between a stowed position and a deployed position. The pivotable cradle member is pivotably mounted with respect to the frame member for releasably receiving the unload tube. The pivotable cradle member includes a surface that is shaped for bearing on an exterior surface of the unload tube. The pivotable cradle member is pivotable between a first rotational position when the unload tube is maintained in the stowed position and a second rotational position when the unload tube is maintained in the deployed position. The locking device locks together the unload tube, the frame member and the pivotable cradle member when the unload tube is maintained in the stowed position.

13 Claims, 5 Drawing Sheets

(56)                    References Cited

U.S. PATENT DOCUMENTS 6,981,833   B2       1/2006   Guhr et al.
8,740,679   B2 *    6/2014   Hollatz ............. A01D 41/1217
                                                   460/114
10,448,568  B2     10/2019  McCully et al.

* cited by examiner

UNLOAD TUBE LOCK FOR AGRICULTURAL VEHICLE

BACKGROUND OF THE INVENTION

1. Field of the Invention

The present disclosure relates to a lock for an unload tube for use with an agricultural vehicle, such as a combine harvester. The unload tube may also be referred to in the art as an unloading conveyor or unload auger.

2. Description of the Related Art

An unload tube of an agricultural vehicle, such as a combine harvester, is used to distribute grain from the grain tank of the combine and into a grain storage or transport container. Described herein is a locking device for retaining (i.e., locking) the unload tube in a docked (i.e., stowed) position during transport of the agricultural vehicle.

SUMMARY OF THE INVENTION

According to one aspect, a combine harvester includes a frame member, an unload tube, a pivotable cradle member and a locking device. The unload tube is configured for expelling clean grain from a clean grain tank of the combine harvester. The unload tube is moveable relative to the clean grain tank and the frame member between a stowed position and a deployed position. The pivotable cradle member is pivotably mounted with respect to the frame member for releasably receiving the unload tube. The pivotable cradle member includes a surface that is shaped for bearing on an exterior surface of the unload tube. The pivotable cradle member is pivotable between a first rotational position when the unload tube is maintained in the stowed position and a second rotational position when the unload tube is maintained in the deployed position. The locking device locks together the unload tube, the frame member and the pivotable cradle member when the unload tube is maintained in the stowed position.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
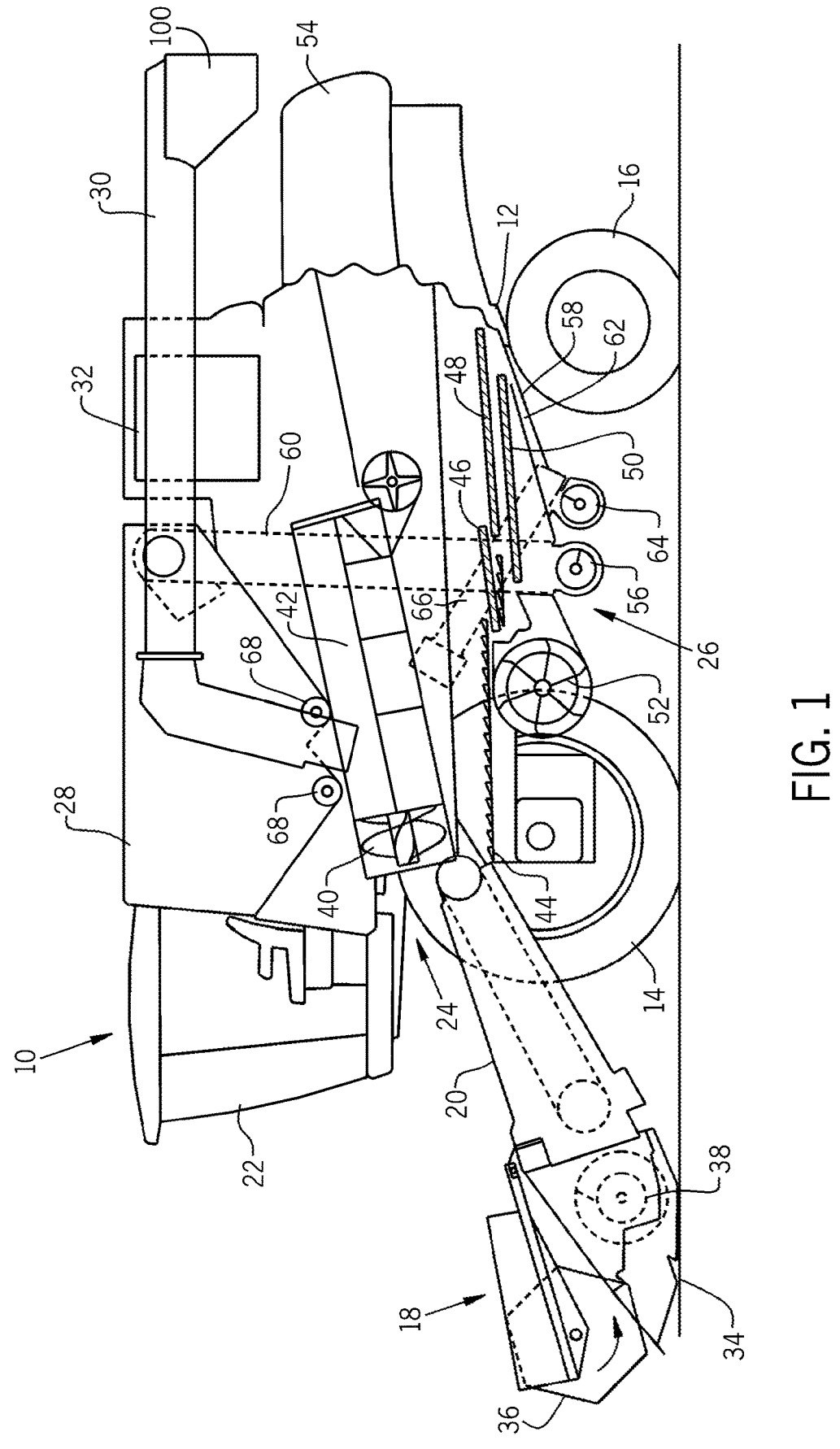
FIG. 1 is a side cutaway view of an embodiment of an agricultural harvester in the form of a combine, which is shown schematically.

Corresponding reference characters indicate corresponding parts throughout the several views. The exemplifications set out herein illustrate embodiments of the invention, and such exemplifications are not to be construed as limiting the scope of the invention in any manner.

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading conveyor 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. The upper sieve 48 and lower sieve 50 can be carried within a common framework. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading conveyor 30 for discharge from combine 10. Unloading conveyor 30 may also be referred to in the art as an unload tube. It should be understood combine 10 is not limited to that which is shown and described. The components and system of combine 10 can vary considerably without departing from the scope and spirit of the invention.

Figure 2:
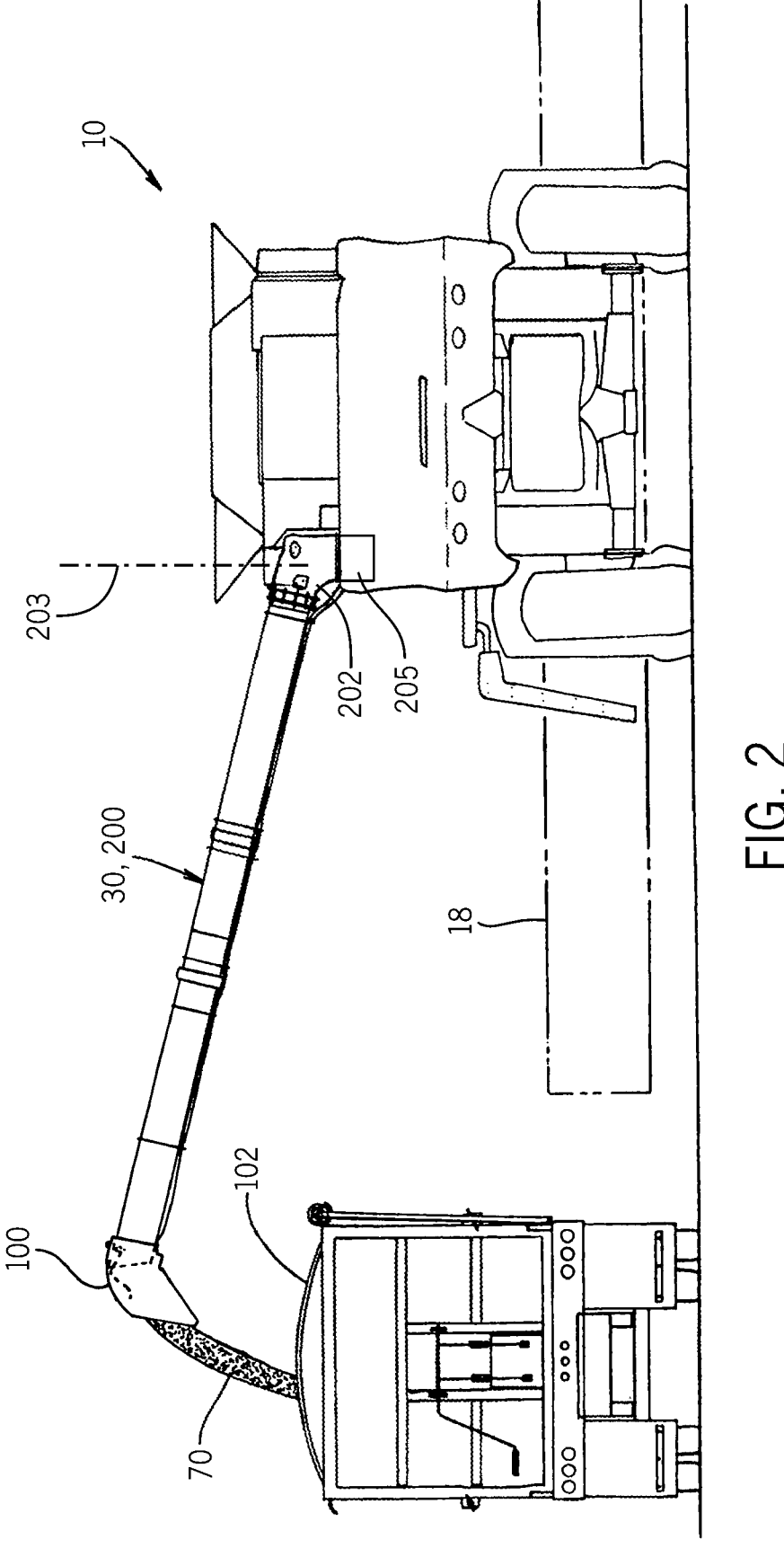
FIG. 2 is a rear end view of the combine of FIG. 1 showing grain unloading from an unload tube of the combine into a truck.

FIG. 2 is a rear end view of the combine 10 of FIG. 1 showing grain unloading from unloading conveyor 30 of combine 10 into a truck 102. Unloading conveyor 30 is shown transversely extending and deployed outwardly in an unloading position as it unloads grain 70 through an unload spout 100 of conveyor 30 and into grain truck 102. This unloading operation can occur as combine 10 and truck 102 are moving, which is referred to as unloading "on the go", or the unloading operation can occur in a stationary manner. At the end of the unloading operation, unloading conveyor 30 will be pivoted to a rearwardly directed transport position, extending along the adjacent side of combine 10. It can be noted here that truck 102 is located a substantial distance to the side of combine 10, which is desired to avoid the possibility of contact with header 18 mounted on the front of combine 10, particularly when unloading on the go. It should also be noted that conveyor 30, when in the unloading position illustrated, will typically be tilted up toward the outer end thereof, at a greater angle, compared to when in the transport position, as additional height is often required to clear the top of the grain receptacle, here illustrated by truck 102.

Figure 3:
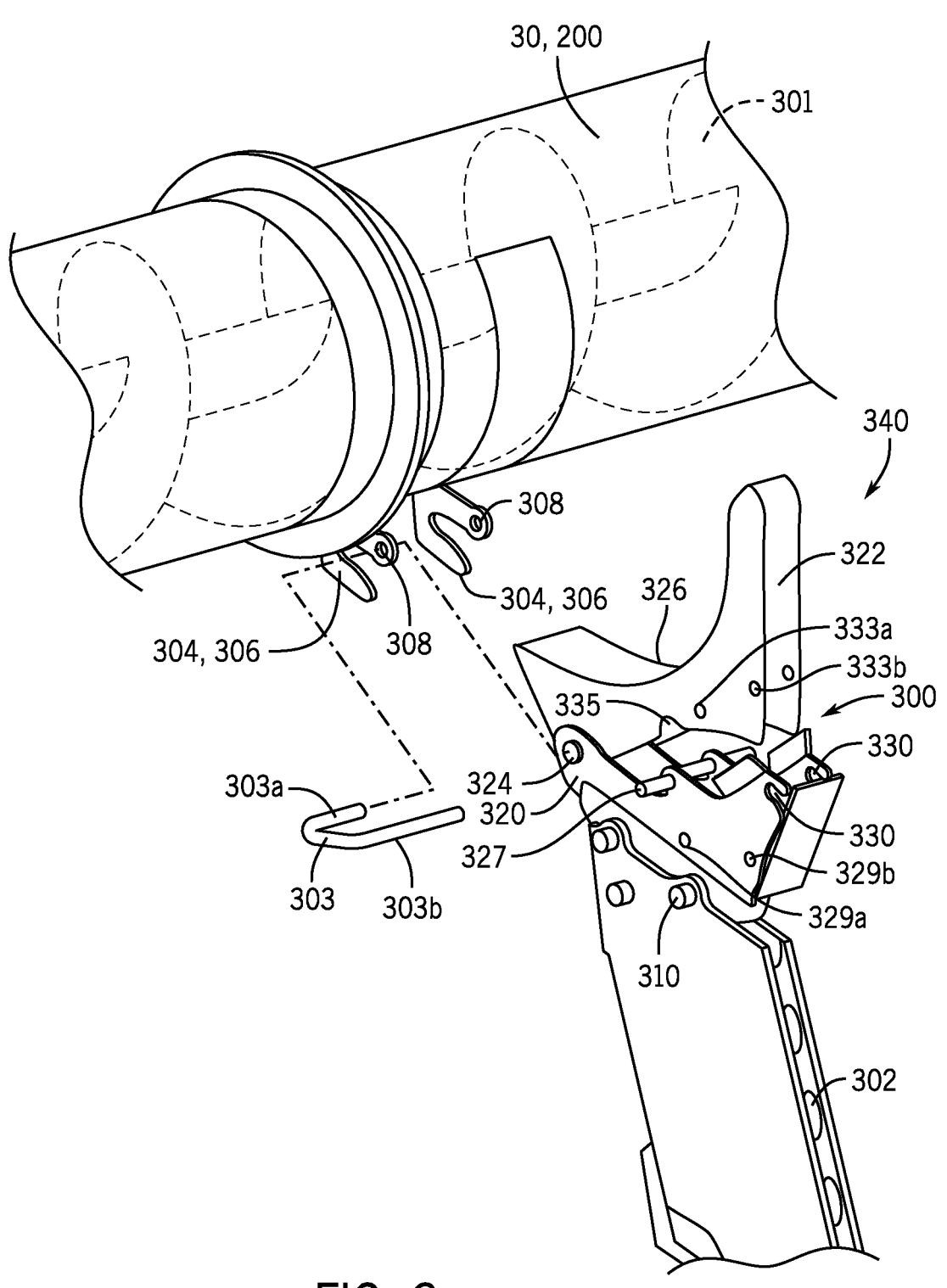
FIG. 3 is an isometric view of an unload tube of the combine of FIG. 1 shown uncoupled from a cradle of the combine.

Turning now to FIGS. 2 and 3, unloading conveyor 30 includes an outer tube 200. As viewed in cross-section, outer tube 200 is not limited to a circular shape, and may take other shapes such as a square or rectangle. Outer tube 200 generally includes an elbow 202 that is rotatably mounted to a fixed mounting surface of combine, such as chassis 12 or grain tank 28. Elbow 202 is configured to rotate about axis 203. Tube 200 is fixed to elbow 202 and rotates therewith about axis 203. One or more augers 301 are positioned in tube 200 for transporting grain toward unload spout 100 that is mounted at the free end of conveyor 30. An actuator 205 (shown schematically) is mounted to elbow 202 for rotating elbow 202 (and the entire conveyor 30) about axis 203 between the stowed position (FIGS. 1, 4 and 5) and the deployed position (FIGS. 2-3). Actuator 205 may be powered hydraulically, electrically, pneumatically by a piston-cylinder arrangement, for example, or actuator 205 may be belt-driven, for example.

Turning now to FIG. 3, conveyor 30 and its outer tube 200 are shown in a deployed position whereupon conveyor 30 is decoupled and spaced apart from a cradle assembly 300 of combine 10. Two brackets 304 are fixedly mounted to the lower end of tube 200. Each bracket 304 includes a first end (not shown) that is fixed to tube 200, and a second end opposite the first end. The second end includes a bifurcated U-shaped member having two prongs 306. The top prong 306 of each bracket 304 includes a hole or opening 308. The brackets 304 are releasably mounted to cradle assembly 300 by a removable or releasable pin 303. Pin 303 is shown exploded from cradle assembly 300 in FIG. 3.

Cradle assembly 300 is mounted to a frame member 302 of combine. Frame member 302 may form part of chassis 12 or grain tank 28, for example. Frame member 302 may constitute a stationary mounting point of combine 10. Cradle assembly 300 is fixed to the top end of frame member 302 by fasteners 310. More particularly, cradle assembly 300 includes a lower stationary cradle member 320 that is fixed to frame member 302 by the fasteners 310, and an upper pivotable cradle member 322 that is pivotably connected to the lower stationary cradle member 320 by a pin or shaft 324 forming a pivot joint and defining a pivot axis for pivotable cradle member 322. In FIG. 3, the upper pivotable cradle member 322 is shown rotated about that pivot axis relative to the lower stationary cradle member 320.

Lower stationary cradle member 320 generally includes two opposing vertical walls that are fixedly mounted together. A series of holes are disposed in member 320, and each hole (optionally) passes through both vertical walls. A first hole is at the first end of member 320 for receiving shaft 324. A second hole is provided in a central region of member 320 for receiving a pin or shaft 327. Two holes 329a and 329b are disposed closer to the second end of member 320 for selectively receiving pin 303. When the pin 303 is moved to an 'unlocked' or 'storage' position of pin 303. One hole 330 is disposed near the top side at the second end of member 320 for selectively receiving pin 303 in the 'locked' position of pin 303. Lower stationary cradle member 320 may be considered as forming part of cradle assembly 300, or, alternatively, cradle member 320 may be considered as forming part of frame member 302.

Upper pivotable cradle member 322 also includes two opposing vertical walls that are fixedly mounted together. The walls are spaced apart such that they can fit in the space between the walls of lower member 320. A series of holes are disposed in member 320, and each hole (optionally) passes through both vertical walls. One hole receives pin 324. Two holes 333a and 333b are disposed closer to the second end of member 320 for selectively receiving pin 303 in the locked position of pin 303. A semi-circular recess or relief is disposed on the lower side of member 322 for engaging with pin 327. Pin 327 provides an end-stop for rotation of pivotable cradle member 322. A curved or saddle shaped surface 326 is mounted above the vertical walls. Surface 326 that is shaped and sized to receive or contact the exterior surface of tube 200.

Pin 303 has a U-shape, and includes two legs 303a and 303b. Leg 303a may be shorter than leg 303b. Pin 303 is removably connected to cradle assembly 300. Pin 303 may be connected to cradle assembly 300 in two different positions (i.e., unlocked and locked positions). The unlocked position of pin 303 may also be referred to and considered as a storage position of pin 303. In the unlocked/storage position of pin 303 shown in FIG. 4, tube 200 is unlocked from frame member 302 and cradle assembly 300 to prevent movement of tube 200. And, in the locked position of pin 303 shown in FIG. 5, tube 200 is locked to frame member 302 and cradle assembly 300. Pin 303 may be captively connected to member 320 by chains 307. Pin 303 may also be more generally referred to herein as a locking device.

Figure 4:
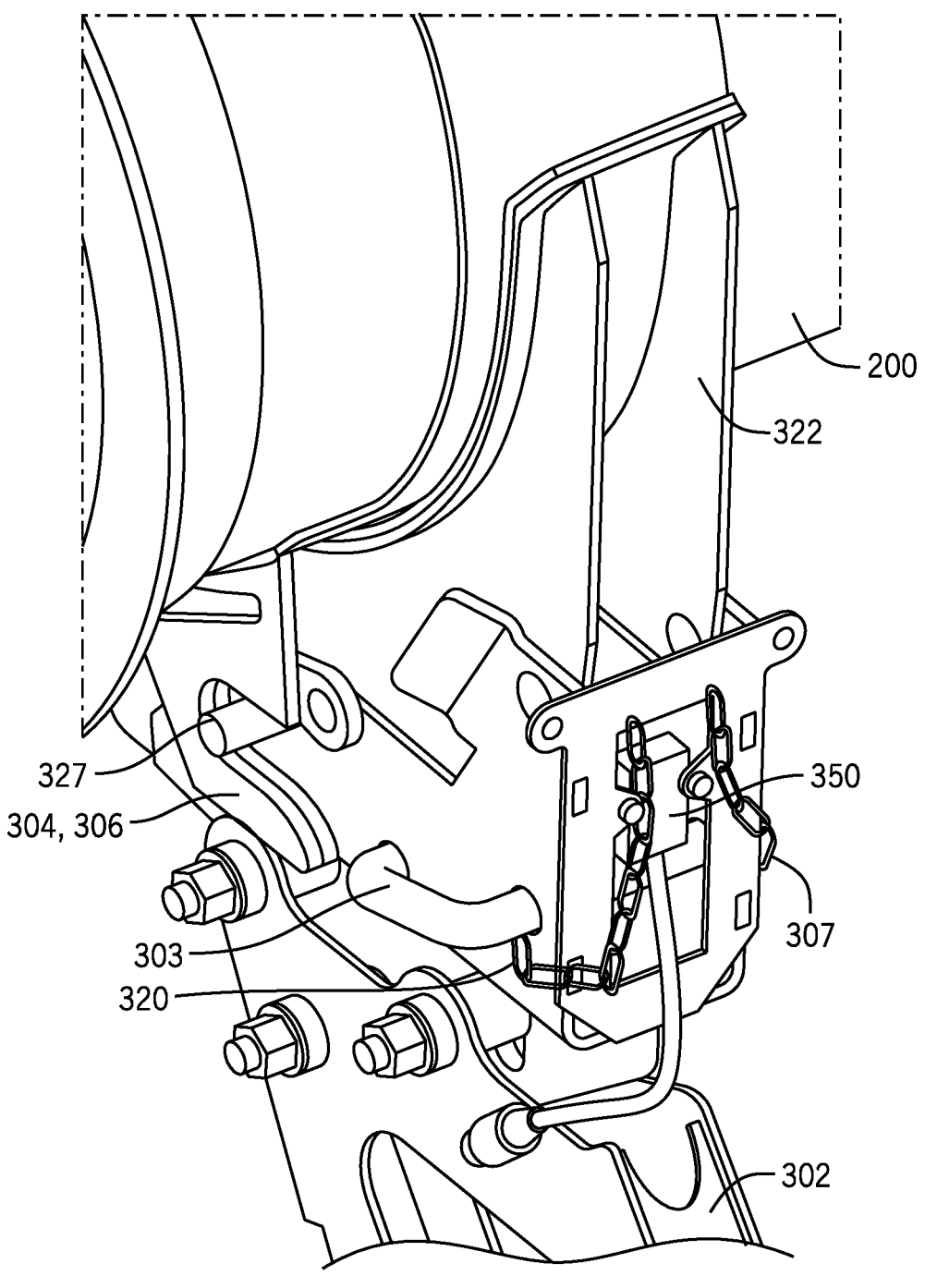
FIG. 4 is an isometric view of the unload tube of the combine of FIG. 1 shown docked to the cradle and unlocked from the cradle.

FIG. 4 depicts the unlocked position of pin 303 in which the tube 200 is unlocked from the frame 302, and the upper pivotable cradle member 322 is free to rotate relative to the stationary cradle member 320. In the unlocked position of pin 303, tube 200 can move relative to the frame 302 between the stowed position of FIG. 1 and the deployed position of FIG. 2. In the unlocked position of pin 303, the short leg 303a of pin 303 is positioned through hole 329a of lower cradle member 320 and the long leg 303b of pin 303 is positioned through hole 329b of lower cradle member 320. Also, the pin 327 is positioned between the prongs 306 of the brackets 304. In the unlocked position of pin 303, the pin 303 is not engaged with upper pivotable cradle member 322 or brackets 304 of tube 200. It is also conceivable that, in the unlocked position of tube 200, pin 303 may simply be removed from combine 10 as opposed to being captively connected to cradle assembly 300 as described above.

Figure 5:
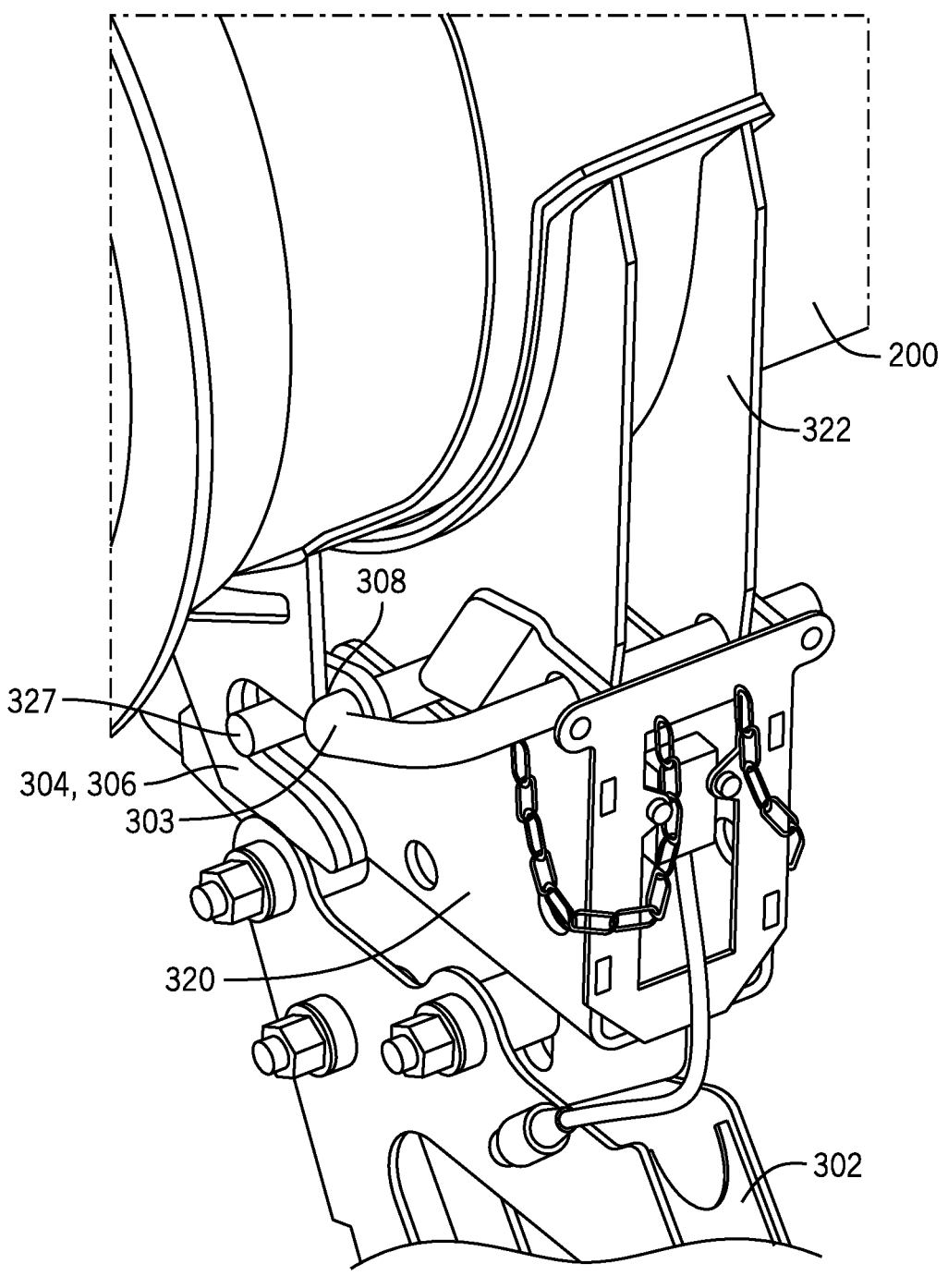
FIG. 5 is an isometric view of the unload tube of the combine of FIG. 1 shown both docked and locked to the cradle of the combine.

FIG. 5 depicts the locked position of pin 303 in which the tube 200 is locked to stationary frame 302, and the upper pivotable cradle member 322 is prevented from rotating relative to the lower stationary cradle member 320. In the locked position of pin 303, the short leg 303a of pin 303 is positioned through holes 308 in brackets 304 as well as hole 333a in upper cradle member 322; and, the long leg 303b of pin 303 is positioned through hole 333b of lower cradle member 320 as well as hole 330 of upper cradle member 322. Thus, in the locked position, pin 303 locks together bracket 304 of tube 200, lower cradle member 320 and upper cradle member 322. Accordingly, tube 200 is prevented from moving away from the stowed position. Also, it is noted that the pin 327 is positioned between the prongs 306 of the brackets 304 in the locked position of pin 303.

In operation, starting from the arrangement of FIG. 4 where pin 303 is maintained in the unlocked/storage position and tube 200 is maintained in the stowed position, activating actuator 205 causes the free end of tube 200 to rotate away from combine 10 toward the deployed position shown in FIG. 2. As the free end of tube 200 rotate away from combine 10, the exterior surface of tube 200 causes upper cradle member 322 to pivot with respect to lower cradle member 320 (about pin 324) to the rotated position shown in FIG. 3. The exterior surface of tube 200 ultimately releases from saddle-shaped surface 326 as tube 200 moves to the position shown in FIG. 3. Upper cradle member 322 may or may not remain in the pivoted position after the tube 200 has detached from cradle assembly 300.

When it is desired to return the tube 200 to the stowed position, the actuator 205 is activated again to cause the free end of tube 200 to rotate toward combine 10 (i.e., toward the stowed position shown in FIG. 2). As the free end of tube 200 rotates toward combine 10, the exterior surface of tube 200 contacts the saddle-shaped surface 326 of upper cradle member 322 which causes the upper cradle member 322 to rotate with respect to lower cradle member 320 (about pin 324) in the direction of arrow 340 to the position shown in FIGS. 4 and 5. The brackets 304 move toward pin 327 such that pin 327 becomes positioned between the prongs 306 of the brackets 304. The user then moves the pin 303 to the locked position. In the locked position of pin 303, the short leg 303a of pin 303 is positioned through holes 308 in brackets 304 as well as hole 333a in upper cradle member 322, and the long leg 303b of pin 303 is positioned through hole 330 of lower cradle member 320 as well as hole 333b of upper cradle member 322. And, in the locked position, pin 303 locks together bracket 304 of tube 200, lower cradle member 320 and upper cradle member 322. Accordingly, tube 200 is prevented from moving away from the stowed position.

A sensor 350 may be mounted to frame member 302, stationary cradle member 320 and/or pivotable upper cradle member 322 for tracking the position of pivotable cradle member 322. Sensor 350 may be a proximity sensor, a potentiometer, a Hall-effect sensor, a photodiode, a linear encoder, a rotary encoder, and so forth.

Pin 303 may be manually moveable between the locked and unlocked positions, as described above, or, alternatively, pin 303 may be replaced with electronically activated pin(s) or other locking device that move between the locked and unlocked positions, as described. For example, the electronically-activated pins may form part of a solenoid or hydraulic device. The solenoid or hydraulic device may be controlled remotely, e.g., from the operator cab 22 of the combine 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combine harvester comprising:
a frame member;
an unload tube that expels clean grain from a clean grain tank of the combine harvester, the unload tube being moveable relative to the clean grain tank and the frame member between a stowed position and a deployed position;
a pivotable cradle member being pivotably mounted to the frame member that releasably receives the unload tube, wherein the pivotable cradle member comprises a surface shaped bearing on an exterior surface of the unload tube, wherein the pivotable cradle member is pivotable between a first rotational position when the unload tube is maintained in the stowed position and a second rotational position when the unload tube is maintained in the deployed position;
a locking device that locks together the unload tube, the frame member, and the pivotable cradle member when the unload tube is maintained in the stowed position;
a stationary cradle member either fixedly connected to or forms part of the frame member, wherein the pivotable cradle member is pivotably mounted to the stationary cradle member; and
at least one hole;
wherein the locking device comprises a pin, and in a locked position of the pin, the pin passes through the at least one hole enabling locking of the unload tube to the pivotable cradle member, the stationary cradle member, and the frame member.

2. The combine harvester of claim 1, wherein each cradle member includes two vertically oriented opposing walls and a plurality of holes extending through the vertical walls.

3. The combine harvester of claim 1, wherein the at least one hole comprises a first hole disposed in the pivotable cradle member, a second hole disposed in the stationary cradle member, and a third hole disposed on the unload tube.

4. The combine harvester of claim 3, further comprising a bracket extending from the unload tube, wherein the third hole is disposed in the bracket.

5. The combine harvester of claim 3, further comprising a fourth hole disposed in the stationary cradle member, wherein in an unlocked position of the pin, the pin is positioned in the fourth hole but the pin is not positioned in the first, second and third holes.

6. The combine harvester of claim 3, wherein the pin has two legs, wherein in the locked position of the pin, one leg of the pin is positioned in the first and second holes, and the other leg of the pin is positioned in the third hole.

7. The combine harvester of claim 1, wherein the pin is manually movable to the locked position.

8. The combine harvester of claim 3, further comprising:
   a bracket extending from the unload tube, wherein the third hole is disposed in the bracket, the bracket having a bifurcated end; and a shaft mounted to the stationary cradle member the shaft being sized to be positioned between prongs of the bifurcated end of the bracket.

9. The combine harvester of claim 1, wherein the locking device is either manually or electronically activated to move to a locking position that locks together the unload tube, the frame member, and the pivotable cradle member.

10. The combine harvester of claim 9, wherein the locking device is activated by a solenoid or hydraulic device.

11. The combine harvester of claim 10, wherein the solenoid or hydraulic device are activated by a controller in an operator cab of the combine harvester.

12. The combine harvester of claim 1, further comprising a sensor that senses a rotational position of the pivotable cradle member.

13. The combine harvester of claim 1, wherein the frame member forms part of a chassis of the combine harvester or the clean grain tank.

* * * * *